United States Patent [19]
Arnold

[11] Patent Number: 5,461,909
[45] Date of Patent: Oct. 31, 1995

[54] OXYGEN ACTIVATION METHOD FOR QUANTITATIVE WATER FLOW MEASUREMENTS WITHIN AND BEHIND WELL BORE CASING

[75] Inventor: Dan M. Arnold, Katy, Tex.

[73] Assignee: Halliburton Logging Services, Inc., Houston, Tex.

[21] Appl. No.: 311,517

[22] Filed: Sep. 23, 1994

Related U.S. Application Data

[63] Continuation of Ser. No. 64,249, May 21, 1993, abandoned.

[51] Int. Cl.$^6$ .......................... E21B 47/00; G01F 13/00; G01N 23/00; G01V 5/00
[52] U.S. Cl. .......................... 73/155; 250/255; 250/264; 250/266; 250/356.1; 250/269.6
[58] Field of Search .......................... 73/151, 154, 155; 250/254, 256, 265, 266, 264, 270, 356.1, 356.2

[56] References Cited

U.S. PATENT DOCUMENTS

| | | | |
|---|---|---|---|
| 3,084,250 | 4/1963 | Dennis | 250/356.2 |
| 3,115,576 | 12/1963 | Rickard | 250/254 |
| 3,239,663 | 3/1966 | Oshry et al. | 250/356.2 |
| 3,603,795 | 9/1971 | Allaud | 250/264 |
| 4,032,778 | 6/1977 | Paap et al. | 250/266 |
| 4,032,779 | 6/1977 | Arnold et al. | 250/270 |
| 4,032,780 | 6/1977 | Paap et al. | 250/270 |
| 4,032,781 | 6/1977 | Arnold | 250/270 |

OTHER PUBLICATIONS

"The Structure and Interpretation of Noise From Flow Behind Cemented Casing," McKinley, Bower & Rumble, PE Paper 3999, presented at the SPE–AIMEE 47th Annual Fall Meeting, San Antonio, Tex., Oct. 8–11, 1972; also published in Journal of Petroleum Technology, Mar. 1973.
"Advances in Nuclear Production Logging," Wichmann, Hopkinson and Youmans, Transactions SPWLA (1967).
"Improved Oxygen–Activation Method for Determining Water Flow Behind Casing," SPE Formation Evaluation, Sep. 1991 McKeon et al. pp. 334–342.
"Pulsed Oxygen–Activation Technique for Measuring Water Flow Behind Pipe," Ostermeier, The Log Analyst, May–Jun. 1991 pp. 309–317.
"Quantitative Monitoring of Water Flow Behind And in Wellbore Casing," Arnold and Paap, SPE–AIME, Journal of Petroleum Technology, Jan. 1979.

Primary Examiner—Robert J. Warden
Assistant Examiner—Krisanne M. Thornton
Attorney, Agent, or Firm—Arnold, White & Durkee

[57] ABSTRACT

A method for measuring the linear flow velocity, radial position, direction, and the flow rate of water flowing within and behind a well borehole casing. A logging tool containing a source of essentially monoenergetic 14 MeV neutrons and at least one gamma ray detector is positioned within the well borehole opposite the zone in which water flow measurements are desired. The neutron source is turned on thereby irradiating any flowing water and other areas in the vicinity of the well borehole with high energy neutrons. After a predetermined irradiation time, the neutron source is turned off. Following a quiescent period of several milliseconds to allow thermal capture gamma radiation to decay to a negligible level, the gamma ray detector is turned on and the count rate from the N-16 induced within the flowing water is recorded as a function of time. The linear flow velocity, the Full Width Half Maximum time period, and the total count are determined directly from the resulting count rate curve. The radial position and the flow rate are determined using the predetermined relationship between the Full Width Half Maximum time period, radial position, and linear flow velocity, and the predetermined relationship between linear flow velocity, radial position, and the ratio of the flow rate to the total count for the logging tool. The direction of flow is determined by sensing the presence or absence of flowing N-16 above or below the source.

14 Claims, 5 Drawing Sheets

OXYGEN ACTIVATION METHOD FOR QUANTITATIVE WATER FLOW MEASUREMENTS WITHIN AND BEHIND WELL BORE CASING

This application is a continuation of application Ser. No. 08/064,249, filed May 21, 1993, now abandoned.

BACKGROUND OF THE INVENTION

This invention relates to well logging methods and more particularly to nuclear well logging techniques to determine the presence of and magnitude of undesired water flow in cement voids or channels behind steel or other types of casing in cased boreholes. The methods can also be used to quantitatively measure water flowing within a borehole in the presence of other fluids such as oil and gas.

Water flow behind casing between different geological formations has long been a serious threat in the petroleum industry. The flow of water from a nearby water filled formation into a producing petroleum formation creates a serious commercial problem in that the unwanted water is produced with the petroleum liquids and subsequently must be disposed of in an environmentally safe manner. Similarly, saline water can flow into fresh water aquifers by migrating through voids or channels in the cement sheathing of cased wells thereby rendering such fresh water unfit for human consumption in all instances. It is desirable to detect the presence of unwanted water flow behind casing, and also to determine the magnitude of the flow expressed as volume flow rate. Such migration usually occurs through multiple paths and between multiple zones penetrated by a single well borehole. Quantitative volume flow rate measurements allow remedial actions to be applied first to the most serious water flow problems.

Acoustic cement bond logging techniques have been used for many years to estimate the quality of the cement behind casing. Acoustic bond logs in general give an estimate as to the degree of bonding between the casing and the cement sheath, and even forms estimates of the bonding between the cement sheath and the formation penetrated by the well borehole. This type of information can be useful in predicting potential hydraulic communication between zones; however, such measurements cannot yield quantitative water flow measurements. As an example, a cement bond log might indicate a poor casing/cement bond between two nearby zones. If the differential pressure between the zones were large, the volume flow of fluid could be great. If the differential pressure between the zones were small, the actual flow of fluid might be very small and not worth of remedial repair of the cement. Stated another way, in monitoring a cased well borehole for hydraulic communication between zones, it is better to directly and qualitatively measure any water flow rather than to measure parameters related to the physical condition of the cement sheath which might result in flows. Acoustic bond logging provides only the latter information.

A paper by R. M. McKinley, F. M. Bower and R. C. Rumble "The Structure and Interpretation of Noise From Flow Behind Cemented Casing," paper SPE 3999 presented at the SPE-AIME 47th Annual Fall Meeting, San Antonio, Tex., Oct. 8–11, 1972, describes a noise logging technique for locating certain types of fluid movement. The technique primarily measures acoustical noise generated by turbulence from high energy expansion of fluids. Since noise generated is a direct function of energy dissipated in the expansion process, this technique does not appear feasible for detecting water channeling when pressure differentials between zones are too low to generate detectable noise amplitudes. In addition, the measurements are somewhat qualitative.

Another approach to locate void spaces or channels in the cement sheath has been to inject a radioactive tracer substance such as iodine-131 (I-131) or the like through the perforations into the formation and into any void spaces in the cement annulus surrounding the well casing. The theory of this type of operation is that if the tracer material can be forced backward along the flow path of the undesired fluid, its radioactive properties may then be subsequently detected behind the casing by radiation detectors. This type of well logging has usually proven to be at best marginally successful, particularly in loosely consolidated sand formations which is regrettably where undesired fluid communication is most typically encountered. A permeable producing formation itself can absorb most of the tracer material which is forced through the perforations in the casing and cement sheath. Very little, if any, of the tracer material can be forced back along the path of the undesired flow, particularly if this involves forcing the flow of tracer against either formation fluid pressure or upwardly against the force of gravity. Therefore, such tracer logging techniques have been proven marginally effective and, at best, yield only qualitative indications rather than quantitative volume flow rates.

A paper by P. A. Wichmann, E. C. Hopkinson and A. H. Youmans, "Advances in Production Logging," Transactions SPWLA (1967) reported that water flowing outside a steel casing was detected with a well logging tool containing a source of 14 MeV neutrons and two gamma ray detectors. The 14 MeV neutrons interacted with the oxygen-16 (O-16) in the water inducing the radioactive isotope nitrogen-16 (N-16), with a 7.13 second half life, by the O-16(n,p)N-16 reaction. Gamma ray activity from the N-16 was detected at two longitudinally mounted detectors positioned "downstream" from the flow yielding not only an indication of flow but the linear flow velocity as well. Linear flow velocity cannot be converted to the desired volume flow rate without a knowledge of the cross sectional area of the flow channel within the cement sheath. This reference does not address this factor and the essential knowledge needed to get an answer.

U.S. Pat. Nos. 4,032,778, '779, '780, and '781 disclose apparatus and methods for determining the linear flow velocity, radial position, direction, and volume flow rate of water flowing within or behind borehole casing. The method is based upon the oxygen activation method discussed previously. The logging tool contains a source of 14 MeV neutrons, at least two gamma ray spectrometers used to detect induced N-16 activity induced by the O-16(n,p)N-16 reaction, a method of determining linear flow velocity from the response of at least two gamma ray spectrometers, a method of determining the radial distance from the center of the logging tool to the center of the flow using the response of at least one gamma ray spectrometer in at least two gamma ray energy ranges, and finally a method of computing volume flow rate within or behind casing using a gross N-16 measurement, the linear flow velocity measurement, and the radial flow position measurement in a predetermined relationship. In order for the gamma ray detectors to record the induced N-16 activity, the flow of water must first pass the source and then the detectors. Direction of flow is, therefore, determined by either reversing the position of the source and two detectors, or using pairs of detectors mounted above and below the source. Excellent results have been obtained using this method over a wide variety of well conditions and flow ranges. The method does, however, require:

1. An oxygen activation background measurement at some depth within the well at which it is assumed that there is no water flow. This background is generated in the environs of the well bore also exposed to the neutron irradiation which, in addition to water, contain the element oxygen (e.g. the formation rock matrices such as $SiO_2$, $CaCO_3$, and the cement annulus itself).

2. At least two gamma ray detectors must be mounted longitudinally within the logging tool on the same side of the neutron source. In order to simultaneously determine the direction of the flow, pairs of detectors must be mounted above and below the neutron source therefore requiring a minimum of at least four gamma ray detectors.

3. The gamma ray detectors must be spectrometers. Stated another way, counting rates in two energy ranges must be measured to determine the gross shape of the measured N-16 gamma ray energy versus gamma ray intensity spectrum which, in turn, is used to compute the radial position of the water flow. This requires a relatively sophisticated spectrometer which adds to the complexity, reliability, and cost of the logging tool.

D. C. McKeon, H. D. Scott, J. R. Olesen, G. L. Patton, and R. J. Mitchell, "Improved Oxygen-Activation Method for Determining Water Flow Behind Casing," SPE Formation Evaluation, September, 1991, present an alternate neutron oxygen activation method for measuring water flow behind casing referred to as the impulse-activation technique. This technique utilizes a logging tool with a source of neutrons and at least one gamma ray detector. Fast neutrons emitted by the source with energies of 10 MeV or greater are used to induce N-16 within the water by the O-16(n,p)N-16 reaction. The flowing water and surrounding well bore environs are irradiated with neutrons for a period of 1 to 15 seconds. Induced activation count rate is then measured as a function of time following termination of irradiation for a period of 20 to 60 seconds. Linear flow velocity is determined from the relative maximum of the count rate versus time measurement following radiation. The method of McKeon, et al. exhibits several advantages over the previously discussed method of U.S. Pat. Nos. 4,032,778, '779, '780, and '781. Specifically, the advantages are:

1. The elimination of the need to make a "background" measurement at some point within the well at which it is assumed that no flow exists.

2. The use of a minimum of one gamma ray detector thereby reducing the complexity of the logging tool.

The primary disadvantages of the method of McKeon, et al. is that no analytical method is presented for converting linear flow velocity to volume flow rate. The reference states that such a conversion can be made knowing the cross sectional area of the flow channel. As stated previously, cross sectional area of a channel within the cement annulus cannot be directly measured. The reference also states that, given an estimate of the distance to the center of the flow channel, volume flow rate can be calculated; however, no quantitative method is disclosed for estimating the distance to the center of the flow channel.

R. M. Ostermeier, "Pulsed Oxygen-Activation Technique for Measuring Water Flow behind Pipe," The Log Analyst, May-June 1991, undertook theoretical studies of water flow measurements based upon the impulse-activation methods of McKeon, et al. The work of Ostermeier corroborated McKeon, et al. Ostermeier noted that the distribution of measured activation count rate versus time following neutron irradiation is a function of the radial distance from the center of the logging tool to the center of the flow channel, further stating that the method should provide all information needed "to fully characterize the channel flow." Ostermeier does not, however, mention volume flow rate or means for determining radial distance to the center of the flow or how to determine volume flow rate from the measured parameters.

SUMMARY OF THE INVENTION

The present invention relates to methods for measuring the linear flow velocity, radial position, direction and the volume flow rate of water flowing within and behind a well bore casing. A well logging tool, which contains a source of essentially monoenergetic 14 MeV neutrons and at least one gamma ray detector, is positioned within the well bore opposite the zone in which water flow measurements are desired. The neutron source is turned on thereby irradiating any flowing water and other environs within the vicinity of the well bore with high energy neutrons. Radioactive N-16 is produced when neutrons with energies of approximately 10 MeV or greater interact with the elemental oxygen component of the water by the O-16(n,p)N-16 reaction. This reaction literally "manufactures" in situ in the flowing water a radioactive "tracer" N-16 which decays with a half life of approximately 7.1 seconds emitting gamma radiation of energy 6.1 and 7.1 MeV. For the moment, assume that a gamma ray detector is mounted longitudinally above the neutron source. After a predetermined irradiation time, the neutron source is turned off. Following a quiescent period of several milliseconds to allow thermal capture gamma radiation to decay to a negligible level, the gamma ray detector is turned on and the count rate from the N-16 induced within the flowing water is recorded as a function of time. The recorded count rate from N-16 induced within the water will first increase as the irradiated water moves from the vicinity of the source toward the vicinity of the detector. The count rate will eventually reach a maximum as the irradiated water reaches the detector, and then decrease as the irradiated water moves past the detector. The time at which the recorded count rate reaches a maximum is directly proportional to the linear flow velocity of the water.

The neutron source emits neutrons with an approximately spherically symmetric distribution around the point source. The vertical extent of neutron irradiation of the flowing water column, for a given irradiation time, will be a function of the radial distance between the neutron source mounted within the logging tool and the center of the flowing stream. Stated another way, the further the flow stream is from the source, the longer the active length of N-16 tracer induced in the flow stream by the neutron irradiation. Gamma radiation is also emitted with the spherical symmetry from each incremental length of the irradiated flow stream segment. Again, for a given irradiation time, the recorded increase and decrease of the count rate will be broader as a function of time as the radial distance between the detector and the flow stream increases. In light of the two summing effects, the radial distance from the center of the logging tool to the center of the water flow can be determined from the shape of the recorded count rate versus elapsed time measurement as will be explained in the Detailed Description of the invention.

A plot of induced activation count rate as a function of elapsed time following irradiation will usually reflect a peak from activity induced in the flowing water superimposed on a background of exponentially decaying activity. This background radiation results primarily from oxygen activation in other stationary borehole environs (e.g., formation matrices such as sandstone ($SiO_2$), limestone ($CaCO_3$) and even the cement sheath). The total count due only to the oxygen activation induced N-16 in the flowing stream is needed to compute volume flow rate. This can be obtained by subtracting background radiation as will be defined in the Detailed Description of the Invention.

The primary parameter of interest, the volume flow rate of the water, is computed from the linear flow velocity, the radial distance to the center of the flow, and the total measured count due only to oxygen activation in the flowing stream.

It was stated previously that the invention requires that the relative positions of the gamma ray detector and the neutron source be such that the water flows first past the source and then past the gamma ray detector. This can be accomplished by either using a logging tool in which the source and detector positions can be reversed, but this requires that a separate measurement with each source/detector configuration be made at each zone of interest in the well. A more operationally efficient method is to position longitudinally a detector above and below the source, thus permitting each zone of interest to be evaluated with a single measurement. This does, however, add to the cost and possibly the reliability of the logging tool. The direction of the flow is determined by which detector records "moving" N-16 activation radiation. As an example, if the water flow were downward, no "moving" N-16 activity would be observed in the detector mounted above the source and all "moving" N-16 activity would be observed by the detector mounted below the neutron source.

In summary, the present invention measures linear flow velocity, radial position, direction, and volume flow rate of water flowing within or behind a well bore casing. Only one gamma ray detector is required if the relative position of neutron source and detector can be reversed. Background measurements are not required in sections of the well where it is assumed that no flow exists.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DESCRIPTION OF THE PREFERRED EMBODIMENT

The present invention is predicated on the creation of the unstable radioactive isotope nitrogen-16 in the stream of flowing water which is to be detected. The isotope is induced by bombarding the water with neutrons having an energy in excess of 10 MeV. Bombardment with neutrons of the oxygen constituent of the water creates the nitrogen-16 isotope by the O-16(n,p)N-16 nuclear reaction.

Discussion of application of the invention will concentrate on measurement of water flowing behind the casing of boreholes. The techniques will work equally well for determining water flow within the well borehole casing. Furthermore, the technique will detect water flow, either within or outside of the well casing, in the presence of other flowing fluids such as oil and gas.

Figure 1:
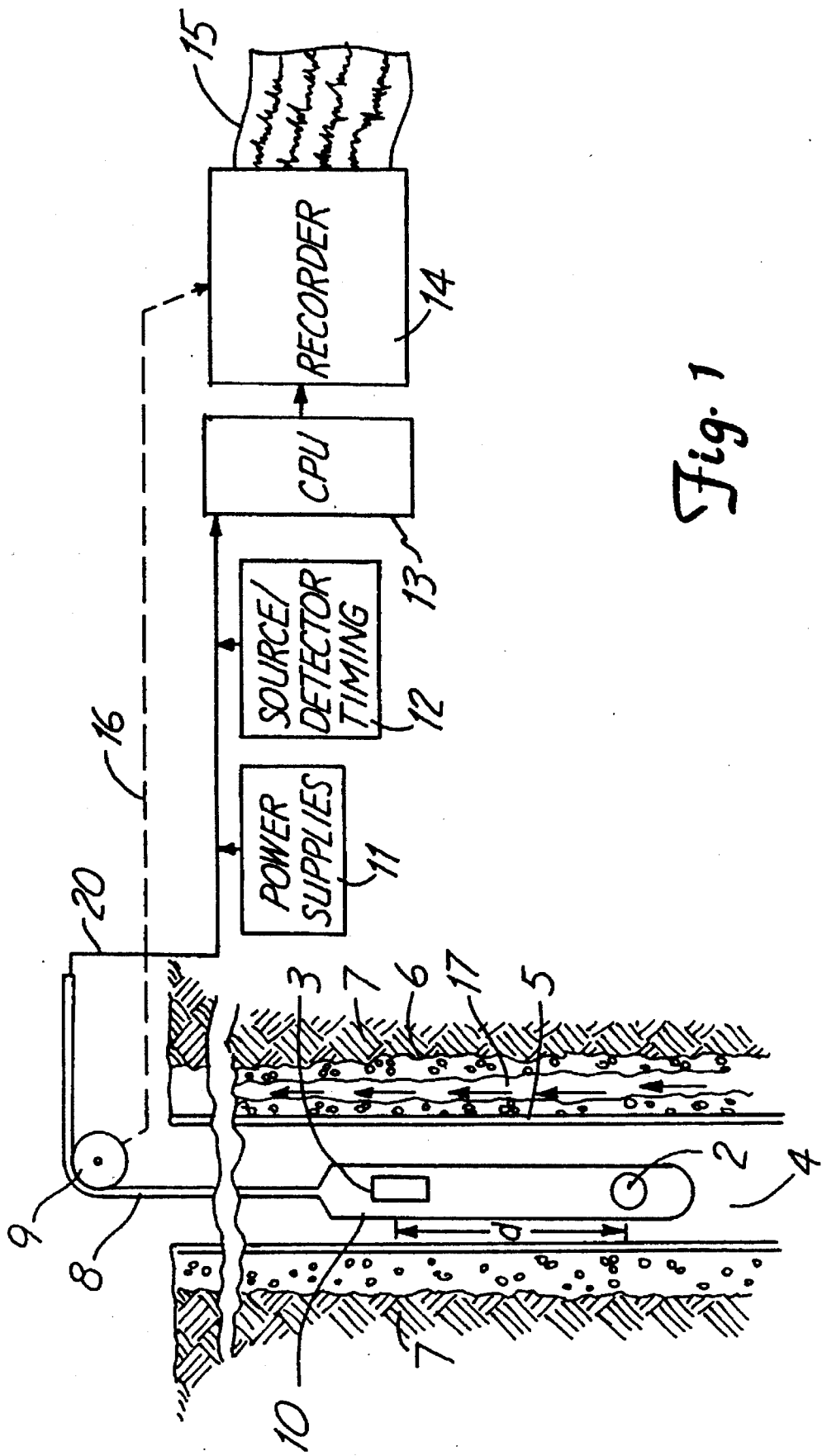
FIG. 1 is a schematic illustration of the water flow logging system.

Referring to FIG. 1, consider a fluid tight well logging tool 10 containing a source of essentially monoenergetic 14 MeV neutrons 2 and a gamma ray detector 3 spaced longitudinally at a distance from the neutron source 2. The logging tool 10 is positioned in a borehole 4 which penetrates one or several earth formations 7. The borehole is cased with a pipe 5 made of steel or other suitable material to maintain the integrity of the borehole 4. The casing 5 in surrounded with a cement sheath 6 to hydraulically isolate multiple earth formation zones 7 which might be penetrated by the borehole.

The well logging tool 10 is lowered and raised within the borehole 4 by means of an armored logging cable 8. The cable 8 contains one or several electrical conductors 20 through which signals are transmitted from the logging tool 10 to the surface of the earth. The cable provides power and control commands to various components of the logging tool 10. In particular, power is supplied from a surface power supply 11 to the source 2 and detector 3 within the logging tool 10. Further, commands from the source/detector timer 12 are transmitted to the logging tool 10 through the conductors 20. The function of these timing commands will become apparent in later discussion in this section.

The logging cable 8 is passed over a surface located sheave 9 to aid in the raising and lowering of the logging tool 10 and to provide a means of determining the depth of the logging tool 10 in the borehole 4. The dashed line 16 indicates either an electrical or mechanical link between the sheave wheel 9 and a recording device 14 for recording tool depth in the well borehole 4.

Signals from the gamma ray detector 3 are transmitted to the surface through the conductor 20 in the logging cable. These signals are input into a central processing unit (CPU) 13 in which the signals are processed as will be described to obtain the flow parameters 15 of interest which, in turn. are recorded by recorder 14.

FIG. 1 also shows a channel 17 in the cement sheath 6 through which water is flowing in the upward direction.

Determination of linear flow velocity, radial position, direction of flow and volume flow rate will be discussed in following sections.

Figure 2:
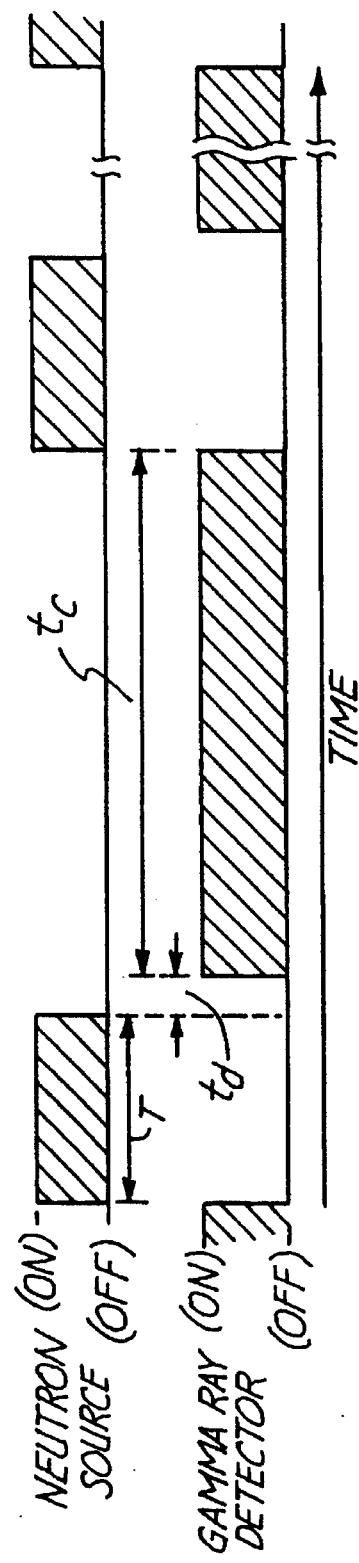
FIG. 2 is a timing chart of the neutron source and gamma ray detector operation.

FIG. 2 illustrates the neutron source and gamma ray detector timing sequences. The source of neutrons 2 is turned on for a time T which might range from several milliseconds to several seconds, depending on the water flow parameters. At the end of the time interval T, the source 2 is turned off. A time $t_d$ is allowed to elapse so that any short lived neutron capture gamma radiation can decay to a negligible level. The gamma ray detector 3 is then turned on for a time $t_c$ which might range from several hundred milliseconds up to one minute, again depending upon the water flow parameters. Selection of optimum timing parameters will be discussed in an example. The predetermined timing sequences of the neutron source 2 and gamma ray detector 3 are controlled by the source/detector timer unit 12. The cycle of irradiation followed by measurement of the count rate is repeated until sufficient data are obtained to yield statistically significant water flow parameter values.

DETERMINATION OF THE LINEAR FLOW VELOCITY

Figure 3:
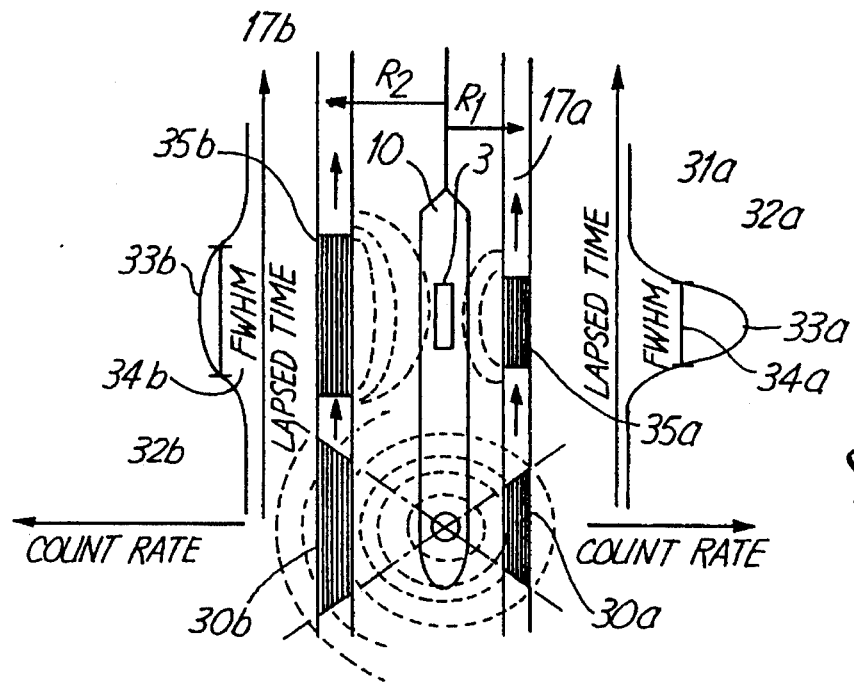
FIG. 3 is a conceptual illustration of the methods used to determine linear flow velocity and the radial position of the flowing water.

FIG. 3 is a schematic diagram of the logging tool 10 in the vicinity of two water flow streams 17a and 17b. The diagram will be used to illustrate several principles associated with the flow velocity measurements. Attention is first drawn to the flow 17a which is in the upward direction parallel to the axis of the logging tool 10 and is radially displaced from the axis of tool 10 by distance $R_1$. The neutron source 2 is turned on for a time T. Neutrons are emitted essentially isotropically irradiating a water length segment 30a and inducing radioactive N-16 therein. After the source 2 is turned off, the irradiated segment moves with the flowing stream 17a and eventually becomes centered opposite detector 3 as illustrated by 35a. The curve 31a is a plot of the count rate recorded by the detector 3 as a function of elapsed time, with elapsed time being measured from the termination of the neutron irradiation period T. As the irradiated segment approaches the detector 3, the count rate 32a increases, reaching a peak or maximum 33a when the irradiated segment is centered opposite the detector 3 as illustrated at 35a.

Figure 4:
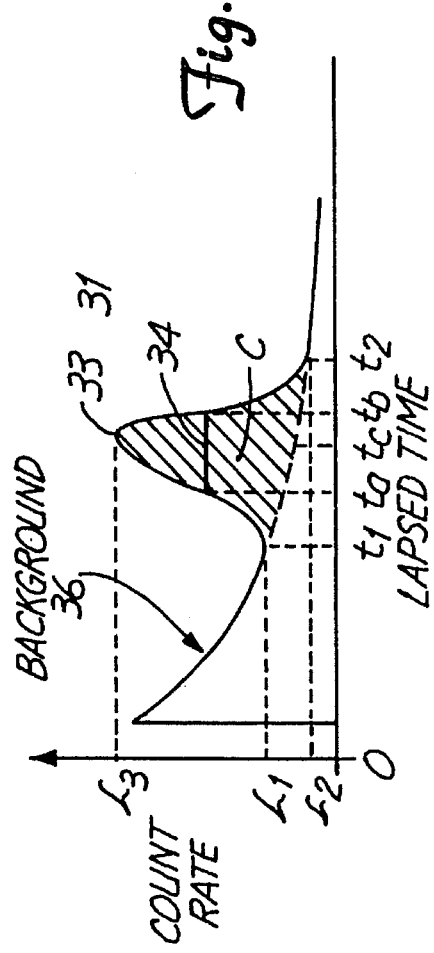
FIG. 4 illustrates the court rate sensed by the gamma ray detector as a function of elapsed time following the termination of a neutron irradiation period.

FIG. 4 illustrates a count rate versus elapsed time measurement which more closely represents results obtained in actually logging operations. The peak 33 is still clearly identifiable, but it is superimposed on a background count rate 36. This background is a result of neutron induced activity in non-flowing borehole environs such as the earth formation matrix (e.g., $SiO_2$ and $CaCO_3$) and even the cement sheath, all of which can contain oxygen or other elements which might become radioactive on bombardment with neutrons. Linear flow velocity of the fluid, v, is determined from the relationship.

$$v = d/tL \quad (1)$$

where tL elapsed time, measured from the time the neutron source is turned off, at which the measured N-16 activity in the flowing stream reaches a maximum at the peak 33.

DETERMINATION OF THE RADIAL POSITION OF THE FLOW

Referring again to FIG. 3, a second flow stream 17b is shown which is parallel to the axis of logging tool 1 and displaced radially a distance $R_2$ from the center of the tool 10. The flow is again in the upward direction with the same linear flow velocity as the fluid in the flow stream 17a. The source 2 again irradiates a segment length 30b of the flow stream inducing N-16 therein. However, since source 2 emits neutrons isotopically and the distance $R_2$ is greater than $R_1$, the effective length of the irradiated segment length 30b is greater than the length of 30a. As the irradiated length flows toward the vicinity of the detector 3, the count rate versus elapsed time will again increase and reach a maximum or peak 33b as the irradiated segment is centered opposite the detector 3 as illustrated at 35b. The width of the peak, as measured by the Full Width Half Maximum (FWHM), will be much broader than the FWHM 34a generated by the flow at a smaller radial displacement. This is due to (i) the increase in the effective irradiation length 30b and (ii) isotopic emission of gamma radiation from each point source within the fluid segment 35b which will broaden the peak 33b as radial displacement increases. In summary, for a given linear flow velocity, the width of the count rate peak versus elapsed time is a function of the radial displacement of the flow stream from the center of the logging tool 10.

Methods for computing FWHM can be outlined referring to FIG. 4. The background count rate 36 under the peak of interest can be estimated as $(c_1+c_2)/2$. The maximum of the peak is, therefore, $(c_3-(c_1+c_2)/2)$. The half maximum is simply half of this value, with a corresponding full width at half maximum of $t_b-t_a$. These computations are well known in gamma ray spectroscopy and are performed in the CPU 13 in actual logging operations.

Figure 5:
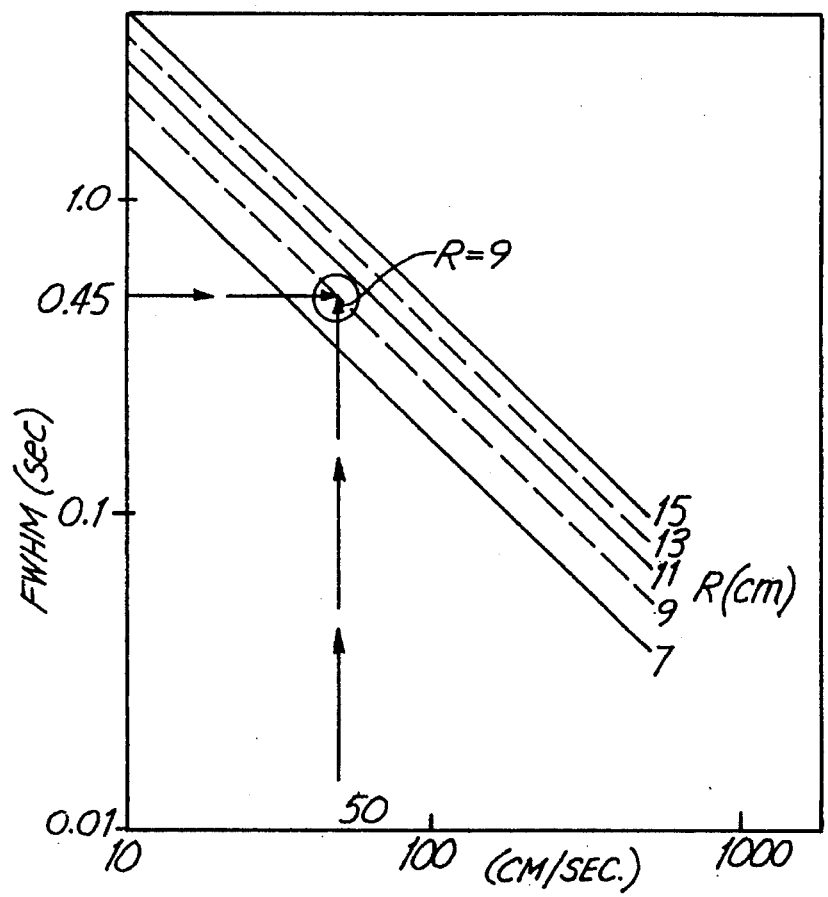
FIG. 5 illustrates graphically the relationship between count rate measured as a function of elapsed time, linear flow velocity, and radial position of the flowing fluid.

The radial distance R can be expressed as a function of linear flow velocity v and the FWHM of the count rate versus elapsed time peak. This relationship is shown graphically in FIG. 5. The graph was constructed from basic data presented in the Ostermeier reference. As an example, if v were determined to be 50 cm/second using the method described in the previous section and FWHM were determined to be 0.45 seconds, the center of the flow would be approximately 9 cm. from the center of the logging tool. FIG. 5 is a graphical solution to illustrate the principle of the measurements and computations. Computations in actual logging operations are performed in CPU 13.

DETERMINATION OF VOLUME FLOW RATE

The geometry (such as channel cross sectional area) of the water flow impacts the measured count rate. As an example, assume that the logging operation encounters two different flow conditions within a given well. Furthermore assume that the linear flow velocities v and the radial positions R for both flows are identical; however, the first flow is a stream parallel to the axis of the casing and the second flow is an encircling annular flow completely surrounding the casing. Recalling that the source 2 emits an essentially isotropic flux, the stream flow will be exposed to only a fraction of the neutron output per unit time while the annular flow will be exposed to essentially all of the flux impinging upon the borehole environs. This is a geometric effect with the net result being that much more N-16 will be induced in the annular flow than within the stream flow. The count rate versus elapsed time will be much greater for the annular flow even though v and R are the same for each. It is, however, obvious that the volume flow rate for the annular flow example would be much greater. It is apparent, therefore, that flow geometry must be accounted for in any measurement of volume flow rate. This is accomplished by measuring the total activation count C denoted graphically in FIG. 4 as the total area under the count rate peak. Methods of measuring peak area are well known in the field of gamma ray spectroscopy. As estimate of the peak area shown in FIG. 4 can be computed from the relationship $$C = 0.5 * (t_2 - t_1) * (c_3 - (c_1 + c_2)/2) \quad (2)$$

where the quantities on the right hand side of equation 2 are defined in FIG. 4 and are measured during the logging operation.

Figure 6:
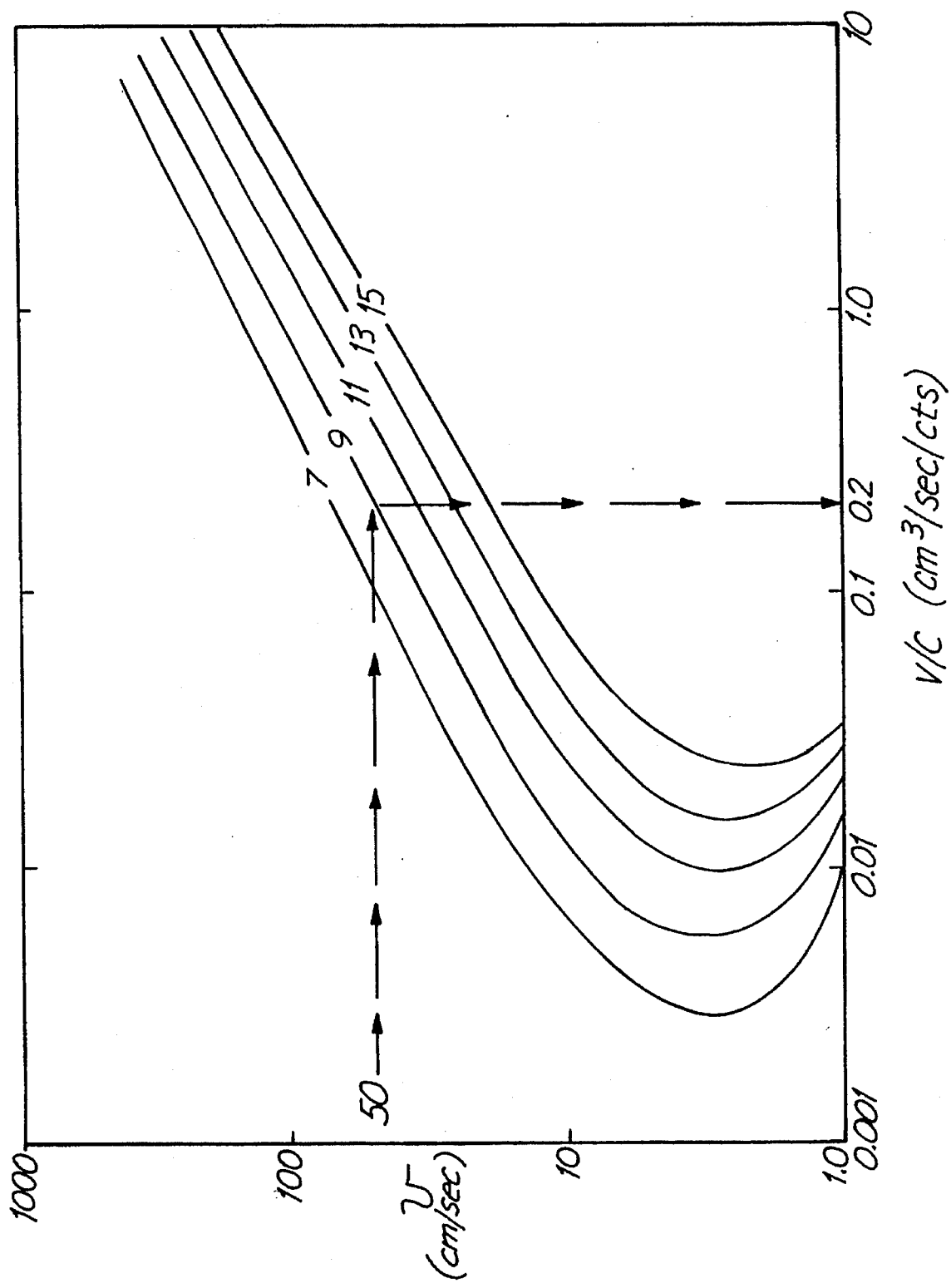
FIG. 6 illustrates graphically the relationship between linear flow velocity, radial position, total activation count, and volume flow rate.

FIG. 6 shows the relationship between R, v, and V/C where V is the volume flow rate. It should be noted that the relationship shown in FIG. 6 is independent of flow geometry. Once v, R, and C have been determined as described previously, the volume flow rate V of fluid within or outside casing can be determined uniquely. Using the previously example of v= 50 cm/sec and FWHM=0.45 seconds which yields R=9 cm, a graphical solution as illustrated in FIG. 6 yields:

$$V/C = 0.2 \ cm^3/sec/counts \quad (3)$$

A measure of C=3000 counts would be a reasonable value for a stream flow using the methods and apparatus of the preferred embodiment of the invention. Therefore, the volume flow rate for the example given would be $$V = 0.2 \times 3000 = 600 \ cm^3/sec \quad (4)$$

DETERMINATION OF THE DIRECTION OF THE FLOW

In order for the detector 3 to detect induced N-16 activity, the water flow direction must be such that it flows first past the neutron source 2 and then the detector 3. The examples and graphs and charts previously discussed show, for purposes of illustration, the detector 3 above source 2 and the direction of flow upward.

The direction of flow is determined by sensing the presence or absence of "flowing" N-16 activity above and below the neutron source 2. This can be done either by constructing the logging tool 10 such that the relative positions of the source 2 and detector 3 can be interchanged, or constructing the logging tool 10 using two detectors, one mounted above and the second mounted below the neutron source 2. Using the first would be made, the tool 10 is removed from the well bore 4, the relative method, the logging tool 10 is lowered in the well bore 4, measurements positions of the source 2 and detector 3 are reversed, the tool 10 is again lowered in the well bore 4 to the depth of interest and additional measurements would be made. The use of the two detector arrangement is be superior operationally although it might add some cost and complexity to the logging tool.

For purposes of illustration, refer to FIG. 7 which illustrates the logging tool 10 with a first detector 40 positioned longitudinally above neutron source 2 and a second detector 41 positioned longitudinally below neutron source 2. If a N-16 activity peak is detected in the count rate versus elapsed time measurement of the lower detector 41, then the water flow is downward. Conversely, if a similar N-16 peak is detected by the upper detector 40, then the flow is in the upward direction.

CALIBRATION OF THE LOGGING TOOL

The relationships between FWHM, R and v illustrated graphically in FIG. 5 and the relationships between v, R, and V/C shown graphically in FIG. 6 are independent of the geometry of the fluid flow channel, other than the radial position R of the flow. The relationships illustrated graphically in FIGS. 5 and 6 are measured during the initial calibration of the logging tool. For convenience, stream flows in parallel pipes are used. Measurements are made with known linear flow velocities v, known radial positions R and known volume flow rates V. Corresponding values of C are measured at each flow condition thereby allowing the relationships shown in FIGS. 5 and 6 to be developed.

PREFERRED EMBODIMENT OF THE INVENTION

Figure 7:
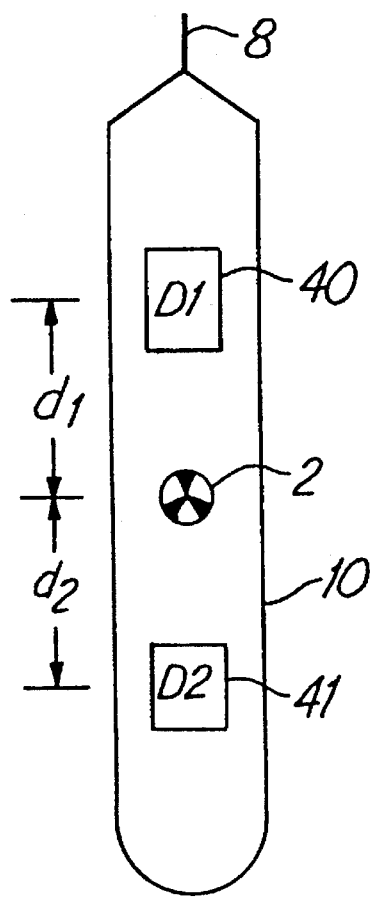
FIG. 7 illustrates the preferred embodiment of the logging tool.

FIG. 7 illustrates the preferred configuration of the logging tool 10. A first gamma ray detector 40 is mounted longitudinally above the neutron source 2 with the center of the detector a distance $d_1$ from the center of the source. A second gamma ray detector 41 is mounted longitudinally below the neutron source 2 at a distance at a distance $d_2$. This arrangement allows the direction of the water flow to be measured during a single logging operation as discussed previously. It is convenient, although not necessary, to set distances $d_1$ equal to $d_2$.

Figure 8:
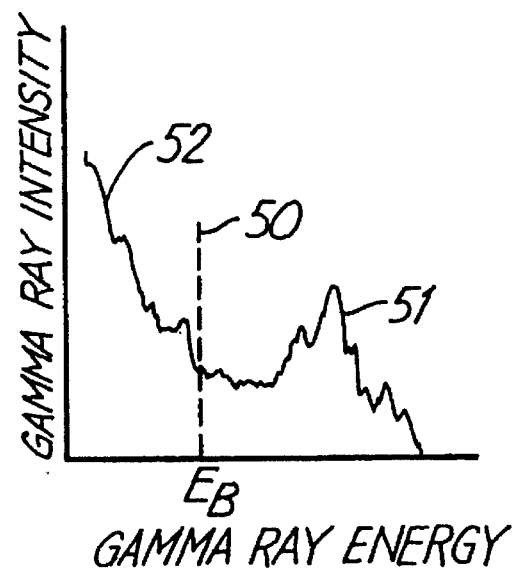
FIG. 8 illustrates a typical neutron induced activation gamma ray energy spectrum recorded by a detector within the logging tool, and an energy bias set therewith.

Gamma ray detectors 40 and 41 are preferably scintillation type detectors such that the energy spectra of the gamma radiation can be measured. Such detectors can comprise scintillation crystals such as sodium iodide cesium iodide, or bismuth germinate optically coupled to a photomultiplier tube, preamplifier and amplifier circuits well known in the art. Water flows are often saline and in particular can contain varying concentrations of sodium iodide (NaCl) up to approximately 250,000 parts per million. Sodium (Na) and chlorine (Cl), when irradiated with 14 MeV neutrons, produce radioactive isotopes fluorine-20 (F-20) and phosphorous-34 (P-34) by the Na-20(n,p)F-20 and Na-23(n,a)P-34 reactions, respectively. F-20 and P-34 decay with half lives of 10.7 and 12.4 sec. emitting primary gamma radiation at 1.63 MeV and 2.13 MeV, respectively. For the purposes of the present invention, this radiation interferes with the previously described measurements and is considered to be noise. A typical energy spectrum measured by the gamma ray detectors 40 or 41 is shown in FIG. 8. Gamma ray intensity is depicted as a function of gamma ray energy. The portion 51 of the spectrum is primarily a result of 7.13 MeV and 6.13 MeV from the decay of N-16 induced by the O-16(n,p)N-16 reaction. The portion 52 of the spectrum is primarily a result of the decay of F-20 and P-34 induced in the saline component of the flowing water by neutron bombardment. It is, therefore, desirable to bias the gamma ray detectors 40 and 41 at a selected energy 50 to exclude the recording of counts resulting from any neutron activation of sodium or chlorine. Setting the bias level 50 at approximately 3 MeV will accomplish this goal.

It is advantageous to adjust the neutron irradiation time T and the elapsed time detector time $t_c$ according to the flow conditions encountered. This is accomplished using the source/detector timing means 12. If the linear flow velocity is fast, it is desirable to shorten the count period $t_c$ since the maximum peak 33 of the N-16 activity will occur soon after termination of the neutron irradiation. At this time, the measurement is essentially completed for a given irradiation count cycle, and it would be statistically advantageous to initiate the next irradiation period immediately. Conversely, if the linear flow velocity is slow, it is helpful to extend the count period $t_c$ sufficiently to allow peak detection. Stream flows will be exposed to only a fraction of the neutron flux emitted by the source 2 while annular flows will be exposed to a much greater flux. This geometric based concept has been discussed above. It is advantageous, therefore, to maximize the irradiation cycle time T if stream flow is suspected in order to induce as much N-16 activity as possible within the limits of other flow parameters. In light of the above relationships, variations in T ranging from a few milliseconds to a few seconds, and varying $t_c$ from a few hundred milliseconds to as much as one minute will yield statistically significant measurements over a wide range of flow conditions.

Values of linear flow velocity, radial position, direction and volume flow rate are computed in the CPU 13 and recorded along with the corresponding depth at which the measurements were made for the hard copy 15, and are digitally stored in a suitable storage device.

While the methods and apparatus herein described constitute the preferred embodiment of this invention, it is to be understood that the invention is not limited to these precise methods and forms of apparatus and that changes may be made therein without departing from the scope of the invention.

While the foregoing is directed to the preferred embodiment of the present invention, other and further embodiments of the invention may be devised without departing from the basic scope thereof, and the scope thereof is determined by the claims which follow.

What is claimed is:

1. A method for measuring linear flow velocity, radial position, and volume flow rate of water in the vicinity of a well borehole, comprising the steps of:

(a) providing a well logging tool having a source of radiation and at least one radiation detector spaced longitudinally from said source;

(b) positioning said well logging tool within the well borehole at a depth at which water flow measurements are desired;

(c) irradiating the well bore environs, including any water present, with radiation from said radiation source;

(d) generating a signal from said radiation detector to detect activation radiation induced in any water and well bore environs by said radiation source;

(e) detecting activation radiation count rate as a function of elapsed time following termination of said irradiation by said radiation source;

(f) determining the linear flow velocity of the water from the elapsed time at which said activation radiation count rate induced within the flowing water reaches a maximum using a predetermined relationship;

(g) determining radial distance from the center of said well logging tool to the center of the water flow from the variation of said activation count rate as a function of said elapsed time using a predetermined relationship;

(h) determining total activation radiation count contribution from the flowing water component following termination of said irradiation from said measure of activation radiation count rate versus said elapsed time using a predetermined relationship; and (i) combining said linear flow velocity, radial distance and total activation radiation count determinations to determine the volume flow rate of the water using a predetermined relationship.

2. The method of claim 1, further comprising the steps of:

(a) positioning at least one radiation detector longitudinally below said source of radiation;

(b) also positioning at least one radiation detector longitudinally above said source of radiation; and (c) determining the direction of the water flow by combining signals generated by said radiation detectors in steps (a) and (b) using a predetermined relationship.

3. The method of claim 2, further comprising the steps of:

(a) initiating and subsequently terminating the operation of said radiation source for a predetermined irradiation period;

(b) initiating and subsequently terminating the operation of said radiation detector for a predetermined count time following a quiescent period after said irradiation period; and (c) repeating steps (a) and (b).

4. The method of claim 3 further providing said radiation source which emits neutrons.

5. The method of claim 3 further providing at least one radiation detector sensitive to gamma radiation.

6. The method of claim 5 wherein the signal from at least one gamma ray sensitive radiation detector is corrected for gamma radiation emitted by well borehole environs constituents other than flowing water.

7. The method of claim 3 wherein said irradiation time is varied and said count time is varied to maximize the statistical precision of said linear flow velocity, radial distance, total activation count and volume flow rate determinations.

8. A method for measuring linear flow velocity, radial position, direction of flow, and volume flow rate of water flowing in the vicinity of a well borehole, comprising the steps of:

(a) providing a well logging tool having a source of 14 MeV neutrons and a first and second gamma ray detectors;

(b) positioning said first detector longitudinally above said neutron source within said well logging tool;

(c) positioning said second detector longitudinally below said neutron source within said well logging tool;

(d) positioning said well logging tool within the well borehole at a depth at which water flow measurements are desired;

(e) irradiating the well borehole environs, including any water present, with said 14 MeV neutrons from said neutron source, thereby inducing radioactive nitrogen-16 within the water by neutron irradiation of the oxygen component of the water through O-16(n,p)N-16 reaction;

(f) after terminating neutron irradiation with said neutron source, operating said first and said second gamma ray detectors to generate signals representative of the decay of N-16 isotope as a function of time following termination of irradiation with said neutron source;

(g) determining the linear flow velocity of the water from N-16 activity as a function of time following termination of said irradiation using a predetermined relationship;

(h) determining radial distance to the center of the water flow by a measure of the rate of build-up and decay of N-16 activity as a function of time following termination of said irradiation using a predetermined relationship;

(i) determining the total measured N-16 activity following termination of said irradiation using a predetermined relationship;

(j) combining said linear flow velocity, said radial distance, and total N-16 activity measurements to determine volume flow rate using a predetermined relationship; and (k) comparing the response of said upper gamma ray detector with said lower gamma ray detector to determine the direction of the flow of the water.

9. The method of claim 8, further comprising the steps of:

(a) initiating and subsequently terminating the operation of said neutron source for a period ranging from several milliseconds to several seconds;

(b) initiating and subsequently terminating the operation of said first and said second gamma ray detectors for a period of several hundred milliseconds to one minute following a quiescent period of 5 to 10 milliseconds; and (c) repeating steps (a) and (b).

10. The method of claim 9 utilizing a bias level of 3 MeV for said first and said second detectors.

11. A method for measuring water flow parameters relating to a well borehole comprising the steps of:

(a) providing a well logging tool having a source of radiation and at least one radiation detector spaced longitudinally from said source;

(b) positioning said well logging tool within the well borehole at a depth at which water flow measurements are desired;

(c) irradiating the well bore environs, including any water present, with radiation from said radiation source;

(d) generating a signal from said radiation detector to detect activation radiation induced in any water and well bore environs by said radiation source;

(e) detecting activation radiation count rate as a function of elapsed time following termination of said irradiation by said radiation source;

(f) determining essential water flow parameters from the elapsed time at which said activation radiation count rate induced within the flowing water reaches a maximum using a predetermined relationship; and (g) combining said essential water flow parameters to determine the volume flow rate of the water using a predetermined relationship.

12. The method of claim 11 including the step of measuring the water flow velocity to obtain volume flow rate.

13. The method of claim 12 including the step of measuring water flow velocity by measuring activation radiation variation over time.

14. The method of claim 12 including the step of measuring flow direction.

* * * * *

UNITED STATES PATENT AND TRADEMARK OFFICE
CERTIFICATE OF CORRECTION

PATENT NO. : 5,461,909
DATED : October 31, 1995
INVENTOR(S) : Arnold

It is certified that error appears in the above-indentified patent and that said Letters Patent is hereby corrected as shown below:

Column 9, line 44, after "first" insert --method, the logging tool 10 is lowered in the well bore 4, measurements--.

Column 9, lines 45-46, after "relative" delete "method, the logging tool 10 is lowered in the well bore 4, measurements".

Signed and Sealed this

Fifth Day of March, 1996

Attest:

BRUCE LEHMAN

*Attesting Officer*   *Commissioner of Patents and Trademarks*